United States Patent [19]

Shiratori

[11] Patent Number: 5,629,909
[45] Date of Patent: May 13, 1997

[54] MAGNETO-OPTICAL RECORDING MEDIUM WITH INITIALIZING LAYER FOR INITIALIZING DIFFERENT REGIONS IN DIFFERENT DIRECTIONS

[75] Inventor: Tsutomu Shiratori, Yokohama, Japan

[73] Assignee: Canon Kabushiki Kaisha, Tokyo, Japan

[21] Appl. No.: 597,382

[22] Filed: Feb. 8, 1996

Related U.S. Application Data

[63] Continuation of Ser. No. 156,839, Nov. 24, 1993, abandoned.

[30] Foreign Application Priority Data

Nov. 30, 1992 [JP] Japan .................. 4-320501

[51] Int. Cl.$^6$ ............................................. G11B 11/00
[52] U.S. Cl. ........................... 369/13; 360/114; 360/59
[58] Field of Search ........................... 369/13, 14, 288, 369/275.4, 110, 275.2, 275.3, 54, 59; 360/59, 114; 365/122; 428/694 ML, 694 SC, 694 EC

[56] References Cited

U.S. PATENT DOCUMENTS

| | | | |
|---|---|---|---|
| 4,837,118 | 6/1989 | Yamamoto et al. | 428/645 |
| 4,932,012 | 6/1990 | Kobayashi | 369/13 |
| 4,955,007 | 9/1990 | Aratani et al. | 369/13 |
| 5,132,945 | 7/1992 | Osato et al. | 369/13 |
| 5,210,724 | 5/1993 | Kobayashi | 369/13 |
| 5,224,080 | 6/1993 | Ohtsuki | 369/13 |

FOREIGN PATENT DOCUMENTS

| | | |
|---|---|---|
| 0428321 | 5/1991 | European Pat. Off. . |
| 0451297 | 10/1991 | European Pat. Off. . |
| 62-264463 | 11/1987 | Japan . |
| 63-268103 | 11/1988 | Japan . |

*Primary Examiner*—Ali Neyzari
*Attorney, Agent, or Firm*—Fitzpatrick, Cella, Harper & Scinto

[57] ABSTRACT

A magneto-optical recording medium consists of a plurality of magnetic layers, and at least one of the plurality of magnetic layers always maintains a magnetization orientation state in which magnetization is oriented in a given direction in a region, where the recording mark string is formed, on a central portion of a recording track, and magnetization is oriented in a direction anti-parallel to the given direction in regions at two sides of the region, where the recording mark string is formed, on side portions of the recording track. With this arrangement, even when recording laser power fluctuates or a tracking control error occurs during an optical modulation over-write operation, generation of an unerased portion of initially recorded information can be suppressed.

4 Claims, 5 Drawing Sheets

MAGNETO-OPTICAL RECORDING MEDIUM WITH INITIALIZING LAYER FOR INITIALIZING DIFFERENT REGIONS IN DIFFERENT DIRECTIONS

This application is a continuation of application Ser. No. 08/156,839, filed Nov. 24, 1993, now abandoned.

BACKGROUND OF THE INVENTION

1. Field of the Invention

The present invention relates to a magneto-optical recording medium capable of performing an over-write operation by modulating a light beam.

2. Related Background Art

As a conventional technique for performing an over-write operation on a magneto-optical recording medium, an optical modulation method (U.S. Pat. No. 5,132,945 or the like) using an exchange-coupled multilayered film or a magnetic modulation method is known. The optical modulation method is more advantageous than the magnetic field modulation method since it allows high-speed modulation, and the use of double-sided media.

An optical modulation over-write method using an exchange-coupled multilayered film is basically attained by a two-layered film comprising first and second magnetic layers. In principle, this method consists of a first type recording process for setting the second magnetic layer in an erased state in advance, and orienting the direction of magnetization of the first magnetic layer in a stable coupling state with respect to the second magnetic layer by a heating/cooling process to a first type temperature state, and a second type recording process for performing recording on the second magnetic layer using, e.g., a bias magnetic field by a heating/cooling process to a second type temperature state, and at the same time, transferring this state to the first magnetic layer. These two types of temperature states are generated in correspondence with modulation of laser power, thereby attaining an over-write operation.

In order to set the second magnetic layer in an erased state in advance, in general, an initialization magnetic field is applied to the second magnetic layer before recording so as to magnetize only the second magnetic layer in the direction of the magnetic field. For this purpose, the coercive force, at room temperature, of the second magnetic layer is set to be smaller than that of the first magnetic layer. In this case, a magnetization device for generating a magnetic field of at least about 2 kOe is required, and a recording apparatus becomes undesirably complicated.

For this reason, as another means for setting the second magnetic layer in an erased state in advance, the following method has been proposed in, e.g., Japanese Laid-Open Patent Application No. 63-268103. In this method, a third magnetic layer which maintains an erased initial state all the time even after the above-mentioned recording operation is stacked on and exchange-coupled to the second magnetic layer. Upon completion of the recording process, the direction of magnetization of the second magnetic layer is oriented in a stable direction with respect to the coupling action to the third magnetic layer, thereby setting the second magnetic layer in an erased state.

Furthermore, still another method has been proposed. That is, the second magnetic layer is removed from the above-mentioned structure, the direction of magnetization of the first magnetic layer is oriented in a stable coupling state with respect to the third magnetic layer by the heating/cooling process to the first type temperature state by using a temperature gradient in the direction of film thickness or the like so as to set the first magnetic layer in an erased state, recording on the first magnetic layer is performed by the heating/cooling process to the second type temperature state, and the recorded state is held.

As a general problem posed upon execution of an optical modulation over-write operation, initially recorded information tends to remain unerased. As one cause of this problem, the width of a recording/erasing region in the over-write operation is decreased to be smaller than that of a region where initial recording information is recorded due to, e.g., a variation of recording laser power, or a recording/erasing region in the over-write operation is shifted from a region where initial recording information is recorded due to, e.g., a tracking control error.

SUMMARY OF THE INVENTION

The present invention has been made in consideration of the above situation, and has as its object to provide a magneto-optical recording medium, which can prevent or at least suppress generation of an unerased portion of initially recorded information even when recording laser power fluctuates or a tracking control error occurs in an optical modulation over-write operation.

In order to achieve the above object, there is provided an optical modulation over-write capable magneto-optical recording medium in which a plurality of magnetic layers are stacked to be exchange-coupled to each other, a recording mark string consisting of a magnetization state with an interface magnetic wall and a magnetization state without any interface magnetic wall can be arbitrarily formed in correspondence with a recording operation for heating/cooling to two different temperature states under an application of a predetermined external magnetic field, and at least one of the plurality of magnetic layers maintains a predetermined magnetization orientation state all the time even after the recording operation, wherein the predetermined magnetization orientation state is a magnetization orientation state in which magnetization is oriented in a given direction in a region, where the recording mark string is formed, on a central portion of a recording track, and magnetization is oriented in a direction anti-parallel to the given direction in regions at two sides of the region, where the recording mark string is formed, on side portions of the recording track.

DETAILED DESCRIPTION OF THE PREFERRED EMBODIMENTS

Figure 1:
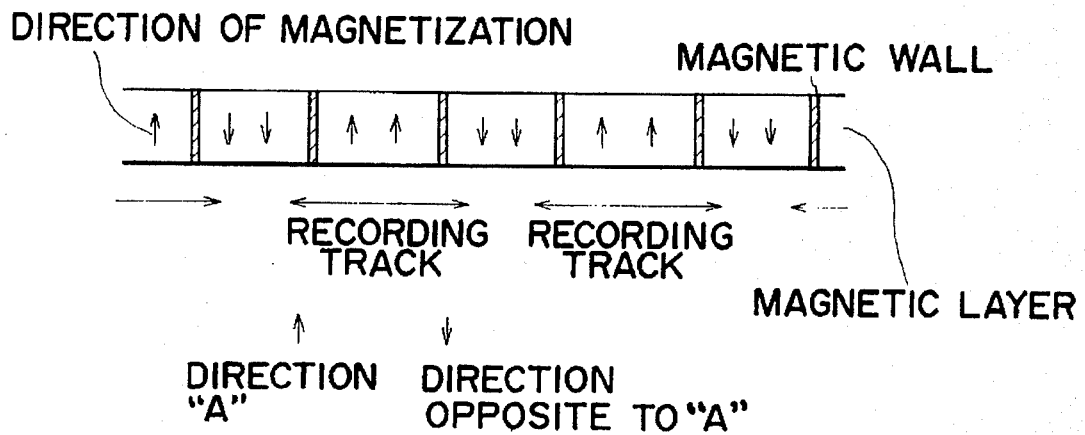
FIG. 1 is a schematic view showing the relationship between grooves/lands on a substrate and the magnetization state of a magnetic layer which maintains a predetermined magnetization orientation state all the time even after a recording operation in a magneto-optical recording medium of the present invention.

A magneto-optical recording medium capable of performing an optical modulation over-write operation according to the present invention has a magnetic layer which maintains a predetermined orientation state all the time even after a recording operation, and the magnetic layer is characterized in that atomic spins are oriented in a direction "A" in a region of the central portion of a recording track, and are oriented in a direction opposite to "A" in regions on the side portions of the recording track, as shown in FIG. 1.

An embodiment of a magneto-optical recording medium according to the present invention will be described in detail below with reference to the accompanying drawings.

Figure 2:
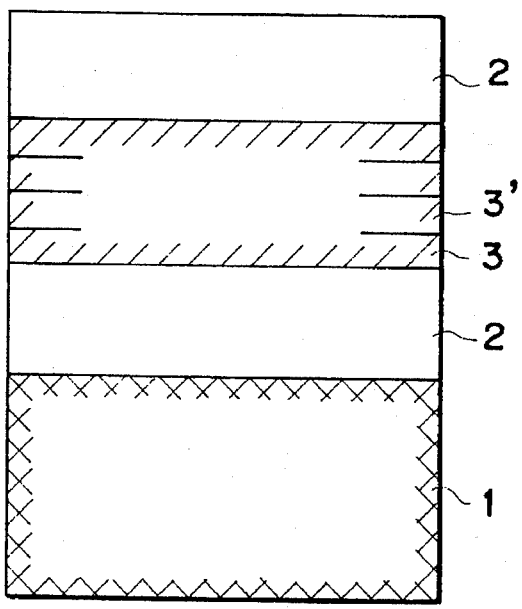
FIG. 2 is a schematic sectional view showing an embodiment of a magneto-optical recording medium of the present invention.

FIG. 2 is a schematic sectional view showing an embodiment of a magneto-optical recording medium of the present invention.

According to the present invention, a plurality of magnetic layers 3, 3', ... are sequentially stacked on a transparent substrate 1 consisting of polycarbonate, glass, or the like via a dielectric layer 2, and another dielectric layer 2 is finally formed on the multilayered film as a protection layer. As the dielectric layer 2, a transparent dielectric material such as $Si_3N_4$, AlN, $SiO_2$, SiO, ZnS, $MgF_2$, or the like can be used. These layers are deposited and formed by continuous sputtering or continuous deposition using, e.g., a magnetron sputtering apparatus. Note that the magnetic layers 3, 3', ... are exchange-coupled to each other since they are continuously formed without breaking the vacuum state. In the above-mentioned medium, the magnetic layers 3, 3', ... can consist of various magnetic materials. For example, each magnetic layer may consist of a rare earth-iron group amorphous alloy containing 10 to 40 at % of one, or two or more of rare earth metal elements such as Pr, Nd, Sm, Gd, Tb, Dy, Ho, and the like, and 90 to 60 at % of one, or two or more of iron group elements such as Fe, Co, Ni, and the like. In order to improve the corrosion resistance, an element such as Cr, Mn, Cu, Ti, Al, Si, Pt, In, or the like may be added in a small amount to the above alloy. The saturation magnetization of each magnetic layer can be controlled by the composition ratio between rare earth elements and iron group elements. Also, the Curie temperature of each magnetic layer can be controlled by the composition ratio. However, in order to control the Curie temperature independently of the saturation magnetization, a method wherein a material in which Fe is partially substituted with Co is used as an iron group element, and the substitution amount of Co is controlled is more preferably utilized. More specifically, when 1 at % of Fe is substituted with Co, a rise in Curie temperature of about 6° C. can be expected. Therefore, the Co addition amount is adjusted to attain a desired Curie temperature using this relationship. When a non-magnetic element such as Cr, Ti, or the like is added in a very small amount, the Curie temperature can be decreased. Furthermore, when two or more different rare earth elements are used, and the composition ratio of these elements is adjusted, the Curie temperature can be controlled.

The present invention will be described in more detail below by way of its examples.

(EXAMPLE 1)

A 80-nm thick silicon nitride layer was formed by sputtering on a disk-shaped substrate (a diameter=86 mm), which was formed with spiral tracks (a pitch=1.6 μm, a land width=1.0 μm, and a groove width=0.6 μm) and was pre-formatted. Five different magnetic layers 1 to 5 listed in Table 1 later were sequentially stacked on the silicon nitride layer without breaking the vacuum state. Subsequently, a 60-nm thick silicon nitride layer was formed on the multi-layered film, thus completing a magneto-optical disk capable of performing an optical modulation over-write operation. A magnetic field of about 15 kOe was applied to the entire surface of the disk to magnetize the direction of magnetization of the magnetic layer 5 in the upward direction perpendicular to the film surface.

It should be noted that this disk is a magneto-optical recording medium, wherein a magnetization state with an interface magnetic wall and a magnetization state without any interface magnetic wall can be arbitrarily formed in correspondence with a recording operation (a first type recording process and a second type recording process) for heating/cooling to two different temperature states under an application of a predetermined external magnetic field, and at least one of the plurality of magnetic layers maintains a predetermined orientation state all the time even after the recording operation.

Figure 3:
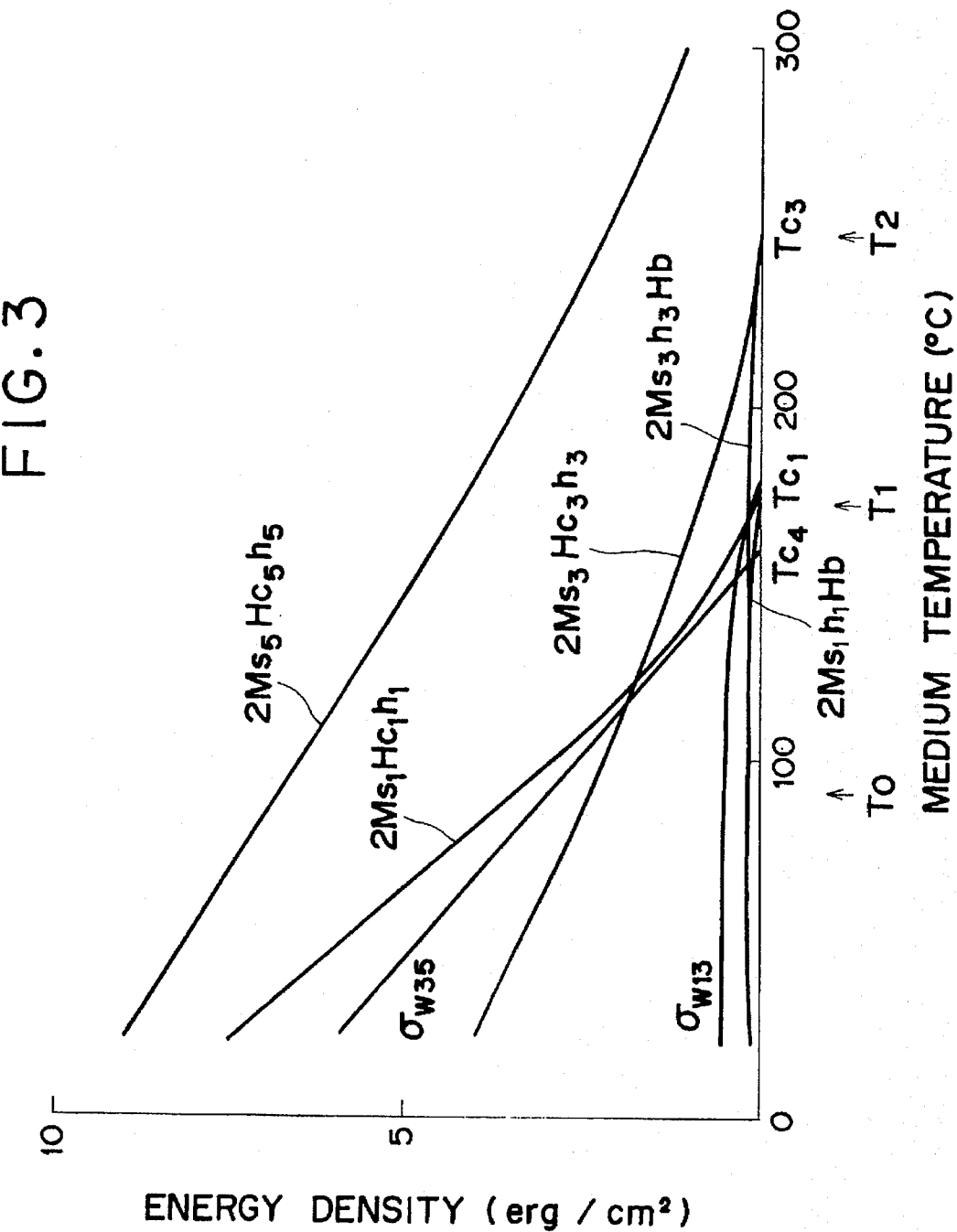
FIG. 3 is a graph showing the temperature dependency of the magnetic energy densities of magnetic layers of the magneto-optical recording medium of the present invention.

In the following description, the saturation magnetization, the coercive force, and the film thickness of a magnetic layer i are respectively represented by $Ms_1$, $Hc_1$, and $h_1$, and the interface magnetic wall energy between magnetic layers i and j is represented by $\sigma_{wij}$. Double signs in each equation have an equal order. FIG. 3 shows the temperature dependency of the magnetic energy densities of the respective layers of the disk when the predetermined external magnetic field to be applied is a downward magnetic field Hb of 300 Oe. FIG. 3 reveals the following facts.

TABLE 1

|  | Material. Composition | h (Å) | Tc (°C.) | Ms (emu/cm$^3$) | Hc (Oe) | $\sigma_w$ (erg/cm$^2$) |
| --- | --- | --- | --- | --- | --- | --- |
| Magnetic Layer 1 | $Tb_{22}(FeCo_{10})$ | 300 | 180 | 50 | >20 k |  |
| Magnetic Layer 2 | $Gd_{35}(FeCo_{35})$ | 200 | 200 | 300 | — | 0.5 |
| Magnetic Layer 3 | $Dy_{21}(FeCo_{30})$ | 200 | 250 | 100 | 10 k |  |
| Magnetic Layer 4 | $Tb_{20}(FeCo_8)$ | 50 | 160 | 100 | 12 k | 6.0 |
| Magnetic Layer 5 | $Tb_{20}Co$ | 300 | >300 | 150 | 10 k |  |

(Remarks) (common to Tables 1 and 2)
h: film thickness
Tc: Curie temperature
Ms: saturation magnetization
Hc: coercive force
$\sigma_w$: interface magnetic wall energy density
(Ms, Hc, and $\sigma_w$ are values at room temperature)

At ambient temperature, the direction of magnetization of the magnetic layer 3 is oriented upward (since iron group element sublattice magnetization is dominant, the atomic spins of iron elements are oriented upward) by $2Ms_3Hc_3h_3 > +2Ms_3h_3Hb \pm \sigma_{w13} - \sigma_{w35}$, and the direction of magnetization of the magnetic layer 1 is oriented in an arbitrary direction by $2Ms_1Hc_1h_1 > \pm 2Ms_1h_1Hb \pm \sigma_{w13}$ independently of the magnetic layer 3.

In the temperature rise process (the temperature rise process in the above-mentioned first type recording process), when the medium temperature becomes a temperature $T_1$ near the Curie temperature (180° C.) of the magnetic layer 1, $2Ms_1Hc_1h_1 < -2Ms_1h_1Hb + \sigma_{w13}$ is satisfied, and $2Ms_3Hc_3h_3 > +2Ms_3h_3Hb \pm \sigma_{w13} - \sigma_{w35}$ is maintained. For this reason, the direction of magnetization of the magnetic layer 1 is oriented in a state wherein coupling by the exchange coupling force is stable so as to follow the orientation state of the magnetic layer 3.

In the temperature rise process (the temperature rise process in the above-mentioned second type recording process), when the medium temperature becomes a temperature $T_2$ near the Curie temperature (250° C.) of the magnetic layer 3, since $2Ms_3Hc_3h_3 < +2Ms_3h_3Hb - \sigma_{w13} - \sigma_{w35}$ is satisfied, the direction of magnetization of the magnetic layer 3 is reversed by the external magnetic field Hb, and is oriented downward.

In the cooling process after the medium is heated to a temperature equal to or higher than $T_2$ (the cooling process in the above-mentioned second type recording process), when the medium temperature becomes equal to or lower than the Curie temperature $Tc_1$ ($>T_0$) of the magnetic layer 1, $2Ms_1Hc_1h_1 < -2Ms_1h_1Hb + \sigma_{w13}$ is satisfied, and $2Ms_3Hc_3h_3 > +2Ms_3h_3Hb \pm \sigma_{w13} - \sigma_{w35}$ is maintained. Therefore, the direction of magnetization of the magnetic layer 1 is oriented in a state wherein coupling by the exchange coupling force is stable so as to follow the orientation state of the magnetic layer 3. Furthermore, when the medium temperature becomes a temperature $T_0$ (about 100° C.) equal to or lower than the Curie temperature of the magnetic layer 4, $\sigma_{w35}$ increases, and $2Ms_3Hc_3h_3 < -2Ms_3h_3Hb - \sigma_{w13} + \sigma_{w35}$ is satisfied. Since $2Ms_5Hc_5h_5 > +2Ms_5h_5Hb + \sigma_{w35}$ is maintained throughout all temperature processes, the direction of magnetization of the magnetic layer 3 is re-reversed to the upward direction while the magnetic layer 5 maintains an initial state. At this time, since $2Ms_1Hc_1h_1 > \pm 2Ms_1h_1Hb \pm \sigma_{w13}$ is satisfied, the magnetic layer 1 maintains the immediately preceding orientation state independently of the magnetic layer 3.

When the medium is cooled before it is heated up to $T_2$ (the cooling process in the above-mentioned first type recording process), since $2Ms_3Hc_3h_3 > +2Ms_3h_3Hb \pm \sigma_{w13} - \sigma_{w35}$ is established, the orientation state of the magnetic layer 3 is left unchanged, i.e., the upward orientation state is maintained.

As a result, irrespective of the presence/absence of a magnetic wall in the initial magnetization state, a magnetization state without any interface magnetic wall between each two adjacent layers can be formed in correspondence with the heating/cooling operation to the first type temperature state in which the medium temperature becomes the temperature $T_1$ near the Curie temperature of the magnetic layer 1, and a magnetization state with an interface magnetic wall between the magnetic layers 1 and 3 can be formed in correspondence with the heating/cooling operation to the second type temperature state in which the medium temperature becomes the temperature $T_2$ near the Curie temperature of the magnetic layer 3. Also, the magnetic layer 5 maintains the initial orientation state all the time throughout all the heating/cooling processes to the above-mentioned two different temperature states.

Figure 4:
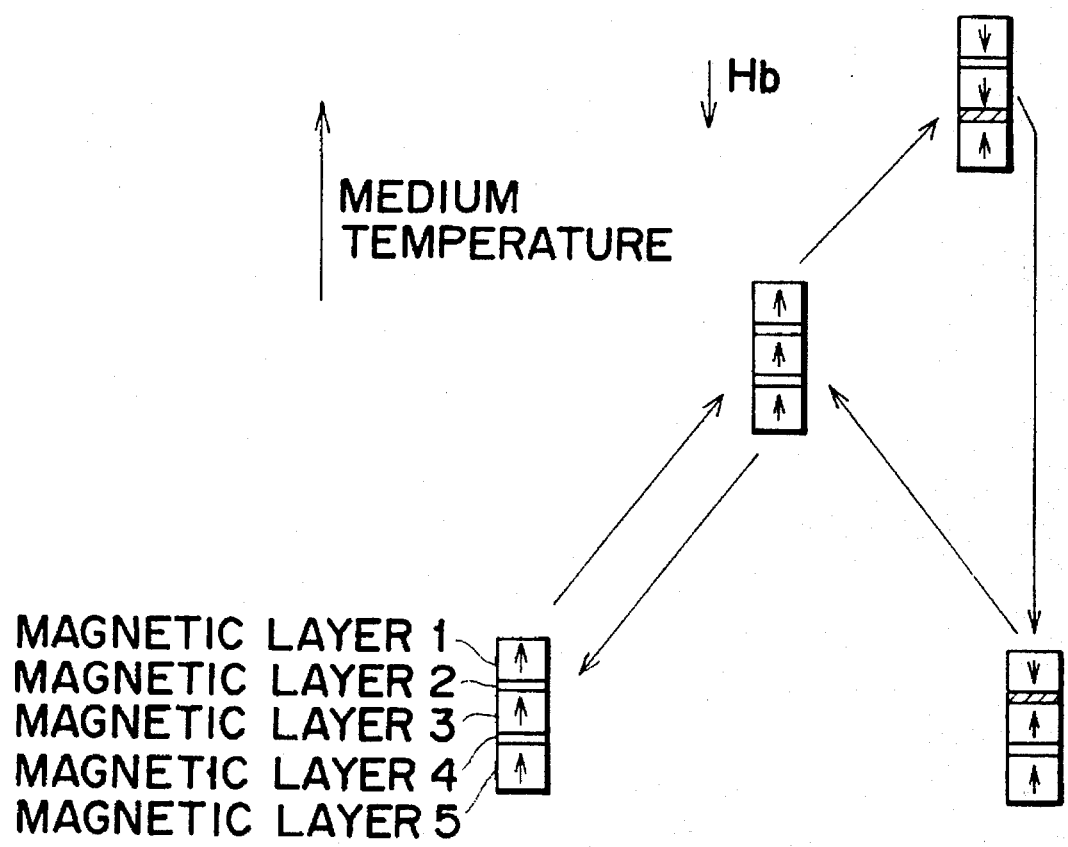
FIG. 4 is a view showing a transition process of magnetization states in correspondence with a change in temperature of the magneto-optical recording medium of the present invention.

In the above description, the coercive force energy and Zeeman energy of the magnetic layers 2 and 4 are ignored since their influences on the behavior of magnetization are small. Also, Bloch magnetic wall energy, diamagnetic field energy, and the like are ignored for the same reason as above. FIG. 4 shows the transition process of magnetization states of this medium in correspondence with a change in temperature. Note that the magnetic layers 2 and 4 are inserted, so that $\sigma_{w13}$ and $\sigma_{w35}$ have desired magnitudes and temperature dependency characteristics, as shown in FIG. 3. For this reason, as the magnetic layer 2, a material having a Curie temperature equal to or higher than $T_{c1}$ ($T_{c1}$ is the Curie temperature of the magnetic layer 1), and smallest possible magnetic wall energy is preferably selected, and as the magnetic layer 4, a material having a Curie temperature equal to lower than $T_{c1}$ and largest possible magnetic wall energy is preferably selected.

A method of forming the orientation state of magnetization of the magnetic layer 5 will be described below. In order to set the magnetization of the magnetic layer 5 in a predetermined orientation state, the disk was rotated at a constant linear velocity of 5 m/sec, and a DC laser beam of 12 mW was radiated on a groove from the innermost periphery to the outermost periphery of the disk under tracking servo control while applying a downward bias magnetic field Hb of 300 Oe. With this operation, the groove portion was heated until the medium temperature became a temperature near the Curie temperature of the magnetic layer 5, the direction of magnetization of the magnetic layer 5 was reversed, and the directions of magnetization of other layers were oriented to follow that of the magnetic layer 5 in the cooling process.

As a result, paying attention to the atomic spins of iron group elements, a groove portion has a magnetization state in which the atomic spins of each layer align downward. In contrast to this, in a land portion, the atomic spins of the magnetic layers 3 to 5 align upward by the initial magnetizing operation, the magnetic layer 1 maintains the orientation state immediately after film formation, and the magnetic layer 2 is formed with a magnetic wall in correspondence with the orientation state of the magnetic layer 1.

This disk was rotated at a predetermined frequency of 60 Hz, and a laser beam having a spot size, the center of which was present on a land, and the two ends of which extended on grooves, was radiated under tracking servo control. In this state, after a signal of 5.8 MHz was initially recorded while applying a downward recording bias magnetic field Hb of 300 Oe at a radius position of 24 mm, an over-write operation was performed, and the erasing ratio of an initial signal spectrum was measured. The laser wavelength was 780 nm, the objective lens NA was 0.53, and the reproduction laser power was 1.0 mW.

In the over-write operation, the laser beam was DC-radiated. In general, in the optical modulation over-write method, a laser was driven using two power level values, i.e., high-level power Ph and low-level power Pl. However, when a laser beam is DC-radiated using only low-level power Pl, since no temperature rise is caused by thermal diffusion from the high-level power Ph radiated portion, a condition for the erasing ratio becomes stricter.

Figure 5:
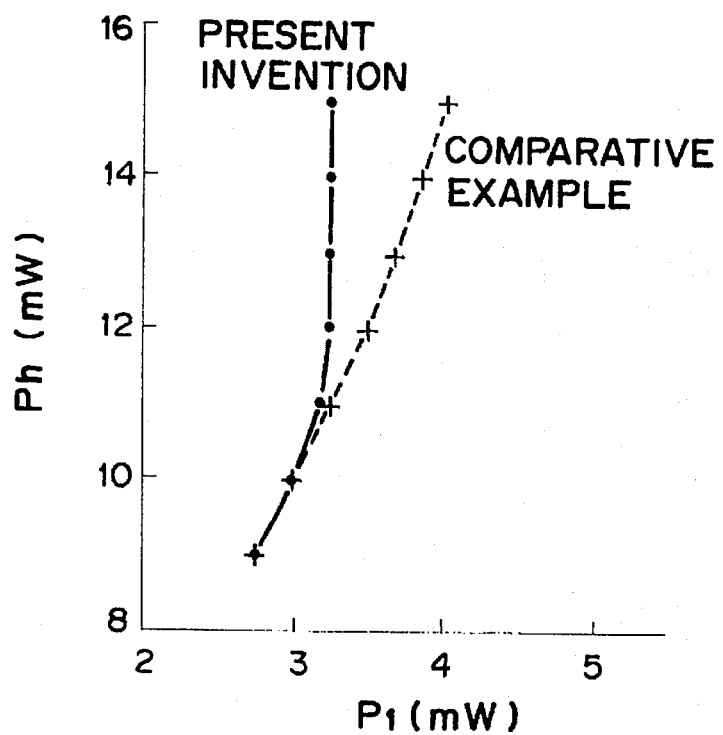
FIG. 5 is a graph showing the erasing characteristics of the magneto-optical recording medium of the present invention in comparison to those of a conventional magneto-optical recording medium.

FIG. 5 shows results obtained by plotting minimum low-level power values Pl necessary for obtaining an erasing ratio of −30 dB or less in correspondence with high-level power values Ph in initial recording when initial recording is performed using various high-level power values Ph, and over-write operations are performed in correspondence with these high-level power values Ph. In this case, the low-level power Pl in initial recording is fixed to be 6 mW.

FIG. 5 also shows results of the same measurement for a conventional disk in a state wherein the direction of magnetization of the magnetic layer 5 is left oriented in one direction on the entire surface, as a comparative example.

In the conventional disk, when initial recording power is increased, the width of a mark to be formed increases. For this reason, when an over-write operation is performed on the initial information, power required for preventing generation of an unerased portion of the initial information increases accordingly. However, in the disk of the present invention, since the width of a mark to be formed is limited to a region, where the atomic spins are oriented upward, of the magnetic layer 5, even when initial recording power is increased beyond a certain level, power required for preventing generation of an unerased portion of the initial information becomes constant. For this reason, the power margin is widened.

Figure 6:
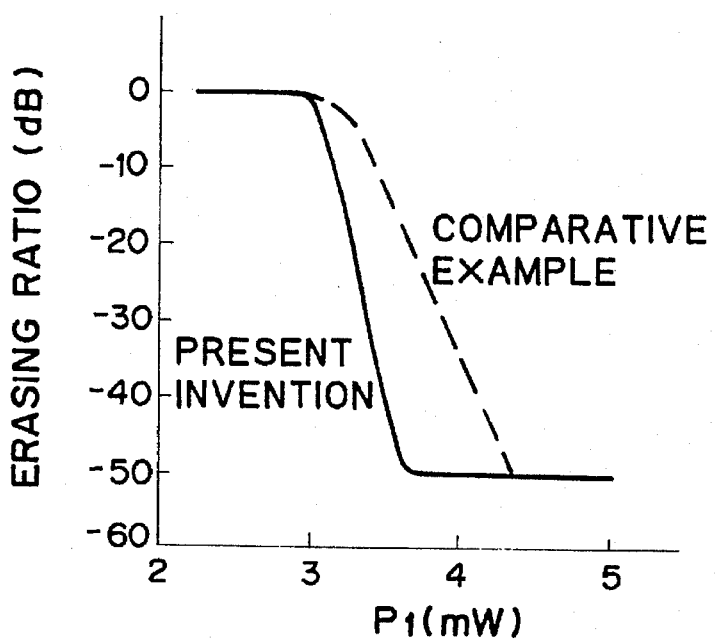
FIG. 6 is a graph showing the erasing characteristics of the magneto-optical recording medium of the present invention in comparison to those of a conventional magneto-optical recording medium.

FIG. 6 shows the measurement results of the erasing ratio of an initial signal spectrum, which ratio is measured in such a manner that initial recording is performed with a detrack of 0.05 μm from the center of a track, an over-write operation is performed with the same detrack amount in the opposite direction, and thereafter, the laser spot is returned to the initial recording position. Initial recording was performed with Ph=13 mW and Pl=6 mW.

In the conventional disk, when an over-write operation is performed at a position shifted from the initial recording position in the widthwise direction of the track, a range wider by twice of the shift amount than a range free from shift must be heated so as to heat the entire range formed with a mark in initial recording in the widthwise direction of the track to a temperature equal to or higher than the erasing temperature by the over-write operation. However, according to the disk of the present invention, since the mark formation position is limited to a region of a land portion, where the atomic spins are oriented upward, of the magnetic layer 5, the erasing characteristics in consideration of a detrack can be remarkably improved.

(EXAMPLE 2)

After four different magnetic layers listed in Table 2 below were sequentially stacked following the same manufacturing procedures as in the medium used in the Example 1, a 10-nm thick silicon nitride layer was formed, and subsequently, a 40-nm thick aluminum layer was formed, thus completing an optical modulation over-write capable magneto-optical disk. However, as a substrate, a disk with non-preformatted grooves was used.

Each of the magnetic layers 3 and 5 had a composition in which rare earth element sublattice magnetization was dominant, and which had a compensation temperature. Furthermore, the magnetic layer 2 arranged for adjusting the interface magnetic wall energy in Example 1 was omitted in Example 2. After the magnetic layer 1 was stacked, it was left to stand for a while to intentionally contaminate the surface, and thereafter, the magnetic layer 3 was stacked, thereby controlling the interface magnetic wall energy.

A magnetic field of about 10 kOe was applied over the entire surface of this disk to magnetize the magnetic layer 5 in the upward direction perpendicular to the film surface.

In order to set the magnetic layer 5 of this disk in a predetermined orientation state, the disk was rotated at a constant linear velocity of 5 m/sec, and a DC laser beam of 14 mW was radiated on a land from the innermost periphery to the outermost periphery of the disk under tracking servo control while applying a downward bias magnetic field Hb of 200 Oe. The laser beam was modulated with sector format information, and was DC-radiated on a data region. With this operation, the land portion was heated until the medium temperature became a temperature near the Curie temperature of the magnetic layer 5, the direction of magnetization of the magnetic layer 5 was reversed, and the directions of magnetization of other layers were oriented to follow that of the magnetic layer 5 in the cooling process.

As a result, paying attention to the atomic spins of iron elements, on the data region of the land portion, the atomic spins of each layer align upward, and on the header portion, the atomic spins are oriented according to the sector format information. In contrast to this, on the groove portion, the atomic spins of the magnetic layer 5 align downward (the direction of magnetization is oriented upward), and the spins of other magnetic layers also align downward to achieve a stable state with respect to the spin orientation of the magnetic layer 5 due to thermal diffusion upon radiation of the laser beam onto the land portion.

Figure 7:
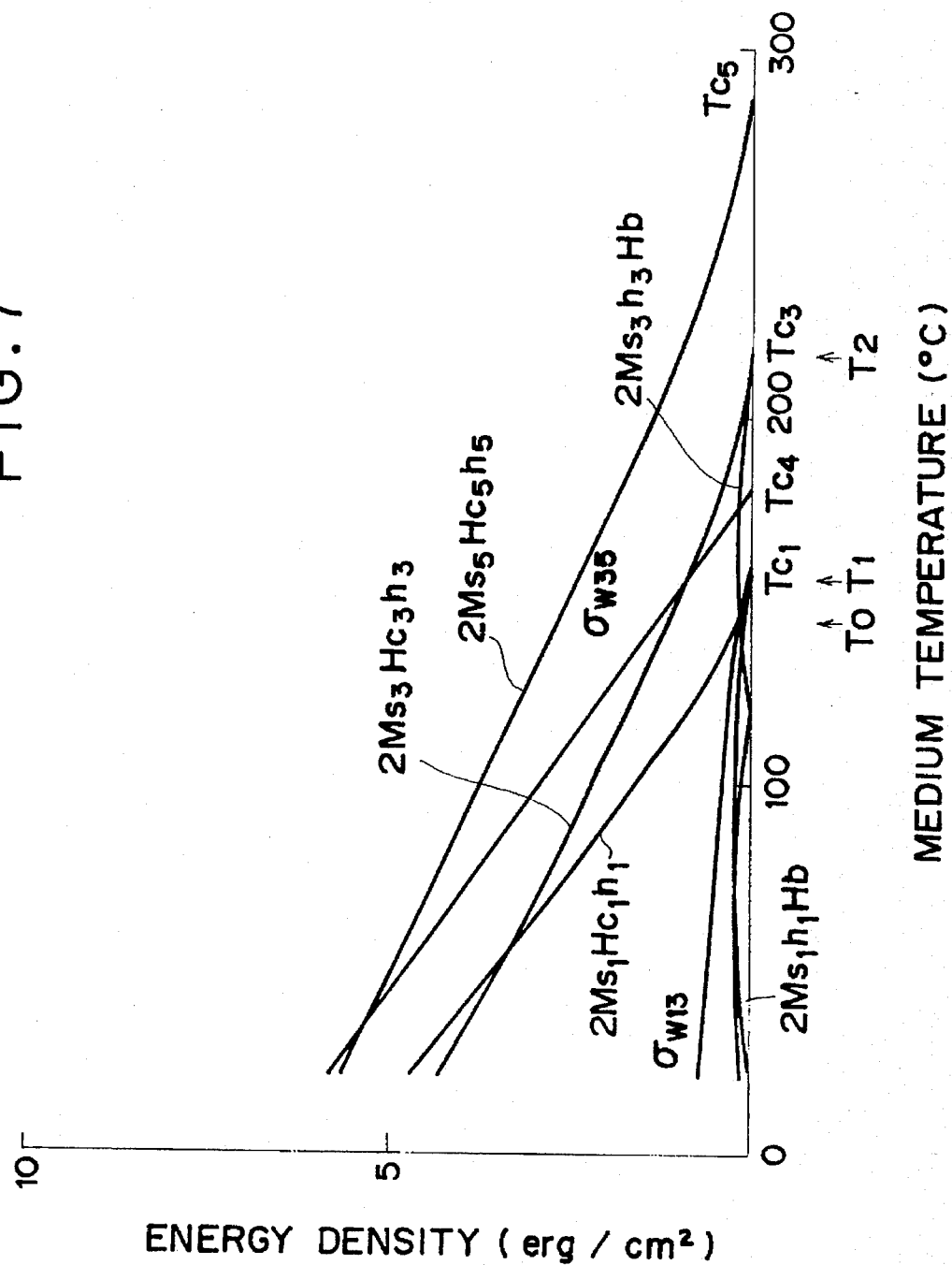
FIG. 7 is a graph showing the temperature dependency of the magnetic energy densities of magnetic layers of the magneto-optical recording medium of the present invention.

FIG. 7 shows the temperature dependency of the magnetic energy densities of the respective magnetic layers when recording is performed on the data region of the land portion while applying a downward bias magnetic field of 300 Oe to this disk. The behavior of the magnetization state corresponding to a change in temperature of this medius can be explained in substantially the same manner as in the medium of Example 1.

The superiority of the erasing characteristics of this disk as compared to a conventional disk is the same as in Example 1. Furthermore, this disk is subjected to software formatting. In this case, since format information which need not be erased is written in the magnetic layer 5 whose orientation state is left unchanged in a normal recording operation, format information can be prevented from being unexpectedly erased by a recording operation on the data region unlike in a conventional disk which is subjected to software formatting.

TABLE 2

|  | Material. Composition | h (Å) | Tc (°C.) | Ms (emu/scm³) | Hc (Oe) | σ_w (erg/cm²) |
| --- | --- | --- | --- | --- | --- | --- |
| Magnetic Layer 1 | Tb$_{22}$(FeCo$_{10}$Cr$_3$) | 200 | 160 | 0 | >20 k |  |
| Magnetic Layer 2 | — | 0 | — | — | — | 0.6 |
| Magnetic Layer 3 | Tb$_{25}$(FeCo$_{20}$Cr$_3$) | 180 | 220 | 120 | 10 k |  |
| Magnetic Layer 4 | Tb$_{20}$(FeCo$_{12}$Cr$_3$) | 50 | 180 | 150 | 7.8 k | 5.8 |
| Magnetic Layer 5 | Tb$_{20}$(FeCo$_{34}$Cr$_3$) | 200 | 290 | 150 | 9.5 k |  |

(EXAMPLE 3)

The same magneto-optical disk as in Example 1 was manufactured, except that a substrate formed with a sample-servo format was used. A DC laser beam was radiated on a portion between each two adjacent tracks of this disk under tracking servo control, thereby reversing the direction of magnetization of the magnetic layer 5 of the radiated portion.

Since a normal disk with a sample-servo format has no groove on a data region, a recording mark may unexpectedly extend to neighboring tracks. However, this disk is free from this problem since no recording mark can be written on a portion where the direction of magnetization of the magnetic layer 5 is reversed in advance, thereby preventing crosstalk of information on neighboring tracks.

The present invention is not limited to the above-mentioned arrangements, but may adopt any other arrangements as long as an arrangement includes a magnetic layer for maintaining a predetermined magnetization orientation state even after recording. Also, the present invention is not limited to an arrangement which has a steep and clear interface between each two adjacent layers, but may adopt an arrangement in which the material composition gradually changes in the direction of film thickness. Furthermore, the magneto-optical recording medium of the present invention does not always require an external magnetic field in recording. For example, recording may be performed by utilizing diamagnetic field energy. The present invention includes such applications within the scope of claims.

As has been described in detail above, according to the recording medium of the present invention, even when recording laser power fluctuates or a tracking control error occurs during an over-write operation, generation of an unerased portion of initially recorded information can be prevented or can at least be suppressed.

As a result, when the recording medium of the present invention is used, wide compatibility can be assured using an inexpensive drive apparatus. Since the margin of medium sensitivity is widened, the product yield of the medium can be improved.

Furthermore, in the recording medium of the present invention, since the recording mark can be prevented from extending beyond a limited width, crosstalk of information on neighboring tracks can be suppressed as compared to a conventional recording medium. Therefore, the recording medium of the present invention is advantageous for improving the track density.

Furthermore, the software-formatted medium of the present invention can prevent unexpected erasing of format information, and reliability can be improved as compared to a conventional software-formatted medium.

What is claimed is:

1. A magneto-optical recording medium having at least first and second magnetic layers and being capable of overwriting a recording mark string recorded in a recording region of said first magnetic layer by using (i) a first kind of recording process in which the direction of magnetization of the first magnetic layer is oriented in a direction that is stable with respect to an exchange-coupling force of the second magnetic layer, which has been initialized, by a heating/cooling process in which the medium is heated to a first temperature, and (ii) a second kind of recording process in which the direction of magnetization of the second magnetic layer is reversed by a heating/cooling process in which the medium is heated to a second temperature and thereafter the direction of magnetization of the first magnetic layer is oriented in a direction that is stable with respect to the exchange-coupling force of the second magnetic layer, characterized in that said magneto-optical recording medium includes an initializing magnetic layer for initializing the direction of magnetization of the second magnetic layer, and wherein said initializing magnetic layer (i) initializes, in a first direction, the direction of magnetization in a first region of the second magnetic layer that corresponds to the recording region of the first magnetic layer for forming the recording mark string, and (ii) initializes, in a direction opposite to the first direction, the direction of magnetization in other regions of the second magnetic layer located on two sides of the first region.

2. A magneto-optical recording medium according to claim 1, wherein each of said magnetic layers consists of a rare earth-iron group amorphous alloy.

3. A magneto-optical recording medium according to claim 1, further comprising a transparent substrate which supports said first and second magnetic layers and said initializing magnetic layer and which is provided with a plurality of groove and land portions, wherein the recording mark string is formed on the land portions.

4. A magneto-optical recording medium according to claim 1, further comprising a transparent substrate which supports said first and second magnetic layers and said initializing magnetic layer and on which a format for sample servo is formed.

* * * * *

UNITED STATES PATENT AND TRADEMARK OFFICE
CERTIFICATE OF CORRECTION

PATENT NO. : 5,629,909
DATED : May 13, 1997
INVENTOR(S) : TSUTOMU SHIRATORI

It is certified that error appears in the above-indentified patent and that said Letters Patent is hereby corrected as shown below:

COLUMN 6

Line 16, "smallest" should read --the smallest--.

Line 19, "equal to lower" should read --equal to or lower--, and "largest" should read --the largest--.

COLUMN 7

Table 2, "(emu/scm$^3$)" should read --(emu/cm$^3$)--.

Signed and Sealed this

Twenty-fifth Day of November, 1997

Attest:

BRUCE LEHMAN

*Attesting Officer*       *Commissioner of Patents and Trademarks*